Aug. 28, 1951 J. R. MULHOLLAND Re. 23,402

RING AND TRAVELER FOR TWISTER FRAMES

Original Filed June 27, 1947

INVENTOR.
James R. Mulholland
BY
Evans + McCoy
ATTORNEYS

Reissued Aug. 28, 1951 Re. 23,402

UNITED STATES PATENT OFFICE 23,402

RING AND TRAVELER FOR TWISTER FRAMES

James R. Mulholland, University Heights, Ohio

Original No. 2,448,150, dated August 31, 1948, Serial No. 757,418, June 27, 1947. Application for reissue August 27, 1949, Serial No. 112,661

10 Claims. (Cl. 57—119)

Matter enclosed in heavy brackets [ ] appears in the original patent but forms no part of this reissue specification; matter printed in italics indicates the additions made by reissue

This invention relates to rings and travelers for twister frames, and has for its object to increase the production of such frames by reducing the breakage of the cord being twisted *and enabling increase in traveler life.*

Twister frames have heretofore been provided with hardened steel rings upon which travelers of spring bronze are slidably mounted. Frequent breakage of the cord being twisted is caused by the abrasive action of worn travelers on the cords and by the dislodgment of worn travelers from the ring.

[In my copending application, Serial No. 686,563, filed July 26, 1946, now abandoned, I have disclosed a ring and traveler in which the traveler is formed of steel and runs upon a ring that is provided with a bearing metal liner.]

The present invention is an improvement upon the invention disclosed in [the aforesaid] *my prior* application [in which] *S. N. 686,563, now abandoned, but* the steel traveler *hereof* bears upon an insert formed of a bearing metal that is rigidly mounted in the interior face of a steel ring.

With the above and other objects in view, the invention may be said to comprise the ring and traveler *and the bearing-metal-lined steel ring adapted for use with a steel travel* as illustrated in the accompanying drawings, hereinafter described and particularly set forth in the appended claims, together with such variations and modifications thereof as will be apparent to one skilled in the art to which the invention pertains.

Reference should be had to the accompanying drawings forming a part of this specification, in which.

Figure 1:
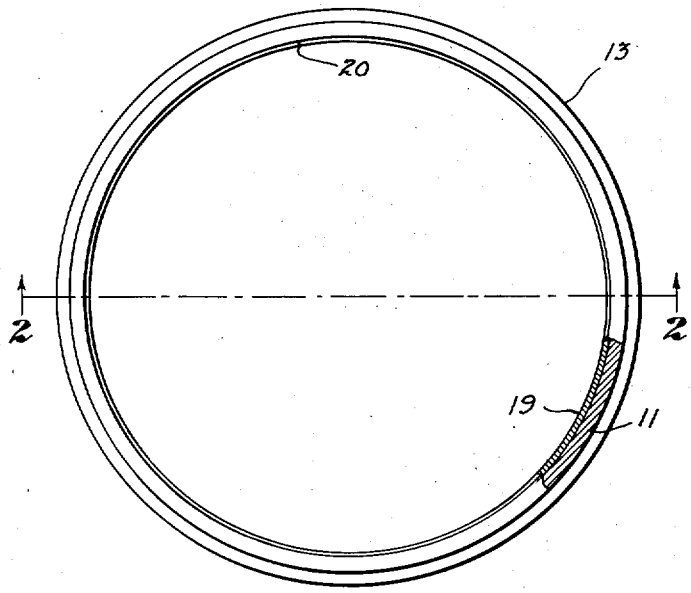
Figure 1 is a top plan view showing a ring embodying the invention.
Figure 3:
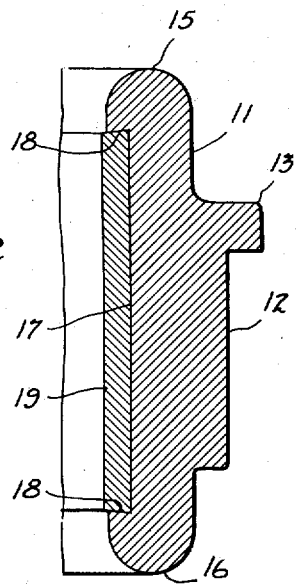
Fig. 3 is a fragmentary view showing a radial section through one side of the ring, the section corresponding to that shown in Fig. 2 but on a larger scale.
Figure 2:
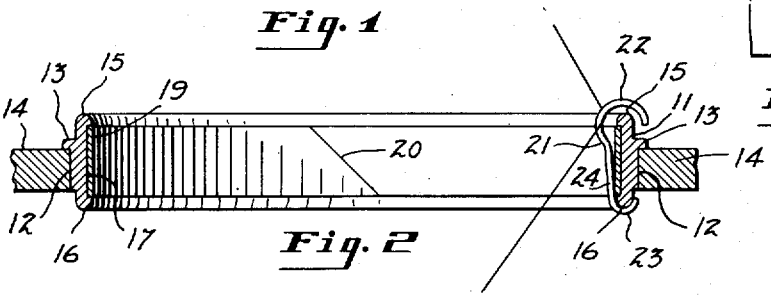
Fig. 2 is a transverse section taken on the line indicated at 2—2 in Fig. 1 *and showing the traveler;*
Figure 4:
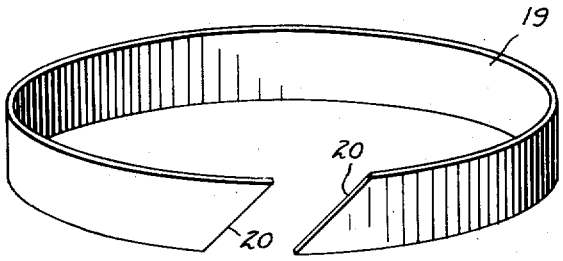
Fig. 4 is a perspective view of the bearing ring.

Referring to the accompanying drawings, the traveler ring 11 of the present invention is a hardened steel ring provided with a cylindrical external portion 12 and a short peripheral flange 13 above the cylindrical portion 12. The cylindrical external portion 12 of the ring 11 fits within a circular opening in a twister rail 14 with the flange 13 bearing against the top surface of the rail. The steel ring 11 has rounded top and bottom edges 15 and 16 and upon the interior face thereof there is provided a circumferential channel 17 [that occupies] *shown as occupying* the major portion of the width of the interior face of the ring. The channel 17 has sides 18, which as shown in Fig. 3 are undercut at a slight angle. The channel 17 receives an annular insert 19 in the form of a transversely split ring composed of a resilient bearing metal such as a nickel copper alloy, in which the nickel content exceeds that of copper, or a spring bronze such as Phosphor bronze. The hardness of the bearing ring is preferably about 165 to 185 Brinell. The annular insert 19 is formed from a strip of sheet metal of a width to fit tightly within the channel 17 and the body 11, and of a length corresponding to the circumference of the channel.

The flat band forming the annulus 19 is rolled to a diameter slightly greater than that of the channel in which the ring is to be mounted, and the ring is pressed into the channel under pressure sufficient to cause the edges of the strip to conform to the undercut sides 18 of the channel. The annular insert 19 has bias cut ends 20 which abut when the ring is placed in the channel 17 so that the insert 19 provides a continuous cylindrical bearing surface. The thickness of the insert 19 is preferably slightly greater than the depth of the channel 17 so that the internal face of the insert after it is mounted in the channel is of a diameter slightly less than that of the internal face of the body 11 of the ring.

A traveler 21 of hardened steel is mounted upon the ring 11 and is provided with a wide cord receiving hook *or curvature* 22 at its upper end which extends over the top edge 15 of the ring 11, and with a hook *or curvature* 23 at its lower end which extends over the lower edge 16 of the ring. The traveler 21 has an intermediate bearing portion *or shank* 24 that bears against the interior face of the insert 19 during operation of the twister frame, during which the traveler slides around the ring.

The hardness of the spring metal bearing insert is considerably less than the hardness of the steel body 11 of the ring, and the hardness of the steel traveler 21 is preferably slightly less than the hardness of the steel body 11 and considerably greater than the hardness of the bearing insert 19.

By reason of the tight fit of the insert 19 in the channel 17, the insert is rigidly held against axial and circumferential movements during operation. *In various stages of twisting operations it is*

*known that a steel traveler will not operate on an all steel ring at the required speeds for those operations. When attempts are made to use that combination at required speeds the traveler opens up and flies off the ring, becoming thereby an extremely dangerous projectile. I believe that a steel traveler working on an all steel ring at the critical speeds produces high frequency vibrations in both the ring and traveler sufficient to open the traveler spasmodically and permit it to leave the ring. Regardless of what may cause the phenomenon the same does not occur in the use of a ring made according to the disclosure of this application. A tentative explanation is that the soft bearing metal of the ring in intimate contact with the steel as hereinbefore described damps such high frequency vibrations or in some such manner prevents occurrence of the phenomenon described above. I have further found that when the thickness of the soft bearing metal liner is considerably less than indicated by the drawing hereof the steel travelers become detached from the ring as happens in the case of an all steel traveler on an all steel ring.*

A hardened steel traveler has the advantage that it will operate for a long period of time before there is appreciable wear on the surface engaged by the cord which slides through the traveler during the operation of the machine. Because of its greater wear resistance the breakage of the cord due to the abrasive action of the traveler is much less frequent. Also the wear on the travelers due to frictional engagement with the ring is much less and the steel travelers have a much longer life.

It is to be understood that variations and modifications of the specific devices herein shown and described for purposes of illustration, may be made without departing from the spirit of the invention.

What I claim is:

1. A ring and traveler for twister frames comprising a hardened steel ring provided with rounded top and bottom edges and a continuous circumferential channel in its interior face, an annular insert formed of a resilient bearing metal softer than the steel of said ring and fitting in said channel, said insert having an internal substantially cylindrical surface and a steel traveler having end portions hooked over the top and bottom edges of said ring and an intermediate portion that slidably engages the cylindrical internal face of said bearing metal insert.

2. A ring and traveler for twister frames comprising a hardened steel ring provided with rounded top and bottom edges and a continuous circumferential channel in its interior face, an annular insert formed of a resilient bearing metal softer than the steel of said ring and fitting in said channel, said insert having a radial thickness slightly greater than the radial depth of said channel and a substantially cylindrical internal bearing surface of a slightly less diameter than the interior face of said ring, and a steel traveler having end portions hooked over the top and bottom edges of said ring and an intermediate portion that slidably engages the cylindrical internal face of said bearing metal insert.

3. A ring and traveler for twister frames comprising a hardened steel ring provided with rounded top and bottom edges and a continuous circumferential channel in its inner face that occupies the major portion of the width of said interior face, an annular insert formed of a resilient bearing metal fitting in said channel and having an internal substantially cylindrical surface of a diameter slightly less than that of the interior face of said ring, and a steel traveler of less hardness than said ring and greater hardness than said insert and having end portions that are hooked over the top and bottom edges of said ring and an intermediate portion that bears against the internal surface of said insert.

4. A traveler ring for twister frames comprising a hardened steel body having rounded top and bottom edges and a continuous circumferential channel in its interior face that occupies the major portion of the width of said interior face, and an insert in the form of a spring bronze bearing ring fitting in said channel and having a substantially cylindrical interior face of slightly less diameter than the interior face of said body.

5. A traveler ring for twister frames comprising a hardened steel body having rounded top and bottom edges and a continuous circumferential channel in its interior face, said channel occupying the major portion of the axial width of said interior face and having the sides thereof undercut at a slight angle, and an insert in the form of a transversely split ring of spring bronze that fits closely in said channel, said bearing ring having abutting bias cut ends and a substantially cylindrical interior face of a diameter slightly less than that of the inner face of said body.

*6. A ring of the class described adapted for use on a twister frame with a steel traveler, having upper and lower curvatures and connecting shank, said ring having a main body of hardened steel formed with rounded, smooth top-defining and bottom-defining surfaces over which the curvatures of the traveler respectively extend loosely to hold the traveler on the ring for free movement around it, said steel ring having its interior-defining face indented between the limits of the rounded surface portions, and a bearing metal annulus softer than the steel snugly occupying the indentation of the steel ring and with an inner smooth surface portion so positioned as to slidably engage the shank portion of the traveler.*

*7. A ring and traveler for twister frames, the ring comprising a steel body having top-defining and bottom-defining rounded hard, wear resisting surface portions and an intermediate interiorly exposed relatively soft, smooth inlaid bearing material surface portion, the traveler being a single piece of steel having upper and lower curvature portions of suitable form to loosely secure the traveler against detachment from said top and bottom ring portions and a shank portion connecting the curvature portions and positioned to slidably engage the inlaid bearing material of the ring as the traveler moves around the ring during a twisting operation, all surface portions of the traveler being somewhat softer than those of the rounded ring surface portions engaged thereby and materially harder than said inlaid bearing-material surface portion of the ring.*

*8. A textile twister ring for use with a steel traveler having upper and lower curvatures and a connecting shank, said ring comprising an annular steel body having rounded upper and lower smooth, hardened rim portions for loose embracement by the curvatures of the traveler and an intermediate inner surface portion for contact with the traveler shank, said inner surface portion comprising a complete annulus of bearing material of substantial thickness and materially softer than the ring-contacting portions of the body and intimately embraced by said body*

*on the outer face and at least one edge of the annulus for location thereof axially of the ring permanently in position parallel to the rim portions of the ring.*

*9. A textile twister ring for use with a steel traveler having upper and lower curvatures and a connecting shank, said ring comprising hardened annular steel rim portions arranged for loose embracement by the curvatures of the traveler and intermediate inner surface portion for contact with the traveler shank of bearing material substantially softer than the rim portions.*

*10. A ring and traveler for twister frames, the ring having top defining and bottom defining rounded annular steel hardened portions and an intermediate interiorly exposed bearing material surface portion substantially softer than said steel portions, the traveler being an elongated piece of steel having upper and lower curvature portions of suitable form loosely to embrace said top and bottom defining portions and secure the traveler against deviation therefrom and the*

*shank of the traveler being inwardly extended to engage the bearing material surface, the portions of the traveler which engage the steep portions of the ring being somewhat softer than said steel portions and the portion of the traveler which contacts the bearing material being substantially harder than such bearing material.*

JAMES R. MULHOLLAND.

REFERENCES CITED

The following references are of record in the file of this patent or the original patent:

UNITED STATES PATENTS

| Number | Name | Date |
|---|---|---|
| 2,194,930 | Feen | Mar. 26, 1940 |

FOREIGN PATENTS

| Number | Country | Date |
|---|---|---|
| 3,517 | Great Britain | of 1901 |
| 422,093 | Germany | Mar. 30, 1926 |
| 115,910 | Switzerland | July 16, 1926 |